(12) United States Patent
Singh

(10) Patent No.: US 9,286,573 B2
(45) Date of Patent: Mar. 15, 2016

(54) COST-AWARE NON-STATIONARY ONLINE LEARNING

(71) Applicant: Xerox Corporation, Norwalk, CT (US)

(72) Inventor: Nidhi Singh, Meylan (FR)

(73) Assignee: XEROX CORPORATION, Norwalk, CT (US)

(*) Notice: Subject to any disclaimer, the term of this patent is extended or adjusted under 35 U.S.C. 154(b) by 315 days.

(21) Appl. No.: 13/944,014

(22) Filed: Jul. 17, 2013

(65) Prior Publication Data
US 2015/0024367 A1    Jan. 22, 2015

(51) Int. Cl.
*G06N 99/00* (2010.01)
*G06K 9/62* (2006.01)

(52) U.S. Cl.
CPC ............ *G06N 99/005* (2013.01); *G06K 9/6256* (2013.01); *G06K 9/6292* (2013.01)

(58) Field of Classification Search
None
See application file for complete search history.

(56) References Cited

U.S. PATENT DOCUMENTS

| | | | |
|---|---|---|---|
| 2006/0010093 A1* | 1/2006 | Fan et al. | 707/1 |
| 2007/0260563 A1* | 11/2007 | Fan et al. | 706/12 |
| 2010/0023307 A1* | 1/2010 | Lee et al. | 703/7 |
| 2011/0282828 A1* | 11/2011 | Precup et al. | 706/54 |
| 2012/0209794 A1* | 8/2012 | Jones, III | 706/12 |

OTHER PUBLICATIONS

Partalas, Ioannis, Grigorios Tsoumakas, and Ioannis Vlahavas. "Pruning an ensemble of classifiers via reinforcement learning." Neurocomputing 72.7 (2009): 1900-1909.*
Goetschalckx, Robby, and Kurt Driessens. "Cost-sensitive reinforcement learning." Proceedings of the workshop on AI Planning and Learning. 2007.*
Gosavi, Abhijit. "Reinforcement learning for long-run average cost." European Journal of Operational Research 155.3 (2004): 654-674.*
Tesauro, G., Jong, N.K., Das, R., Bennani, M.N.: On the use of hybrid reinforcement learning for autonomic resource allocation. Cluster Comput. 10 (3), 287-299 (2007).*
Perez, J., Germain-Renaud, C., Kégl, B., Loomis, C.: Multi-objective reinforcement learning for responsive Grids. Journal of Grid Computing 8 (3), 473-492 (2010).*
Kolter, et al. "Dynamic weighted majority: an ensemble method for drifting concepts" J. Mach. Learn. Res., vol. 8, Dec. 2007, pp. 2755-2790.
Jacobs, et al. "Adapting to non-stationarity with growing expert ensembles" Thesis, 2011, pp. 1-64.

(Continued)

*Primary Examiner* — Alan Chen
*Assistant Examiner* — David H Kim
(74) *Attorney, Agent, or Firm* — Fay Sharpe LLP

(57) ABSTRACT

Online learning of an ensemble of classifiers or regressors is performed to predict a non-stationary time-varying parameter over a time series of episodes. For an episode, an ensemble action is selected from a set of ensemble actions based on ensemble action quality values (Q values) at an error state for the episode. The selected ensemble action is executed to update the ensemble. A cost of executing the selected ensemble action is computed or retrieved, and a reward is computed indicating how well the updated ensemble predicts the non-stationary time-varying parameter over the episode. The Q value for the selected ensemble action at the error state for the episode is updated based on both the reward and the cost of executing the selected ensemble action. The cost may be based on the ensemble action alone, or on both the ensemble action and the error state for the episode.

19 Claims, 2 Drawing Sheets

(56) References Cited

OTHER PUBLICATIONS

Elwell, et al. "Incremental learning of concept drift in nonstationary environments" Trans. Neur. Netw. vol. 22, No. 10, Oct. 2011, pp. 1517-1531.

Ditzler, et al. "An incremental learning algorithm for non-stationary environments and class imbalance" Proc. of the 2010 $20^{th}$ Intl. Conf. on Pattern Recognition, ICPR'10, pp. 2997-3000.

Elwell, et al. "Incremental learning of variable rate concept drift" Proc. of the $8^{th}$ Intl. Workshop on Multiple Classifier Systems, MCS'09, 2009, pp. 142-151.

Watkins, C.J.C.H., "Learning from delayed rewards" Ph.D. dissertation, May 1989, pp. 1-234.

Strehl, et al. "PAC model-free reinforcement learning" Proc. of the $23^{rd}$ Intl. Conf. on Machine Learning, Ser. ICML'06, pp. 881-888.

Tysymbal, A. "The problem of concept drift: definitions and related work", Computer Science Department, Trinity College Dublin 2004, pp. 1-7.

Elwell, et al. "Incremental learning in nonstationary environments with controlled forgetting" Proc. of the 2009 Intl. Joint conf. on Neural Networks, ser. IJCNN'09, 2009, pp. 771-778.

* cited by examiner

COST-AWARE NON-STATIONARY ONLINE LEARNING

BACKGROUND

The following relates to online non-stationary learning, workload usage or load prediction, and related arts.

Online learning entails predicting a parameter of interest as that parameter is changing, i.e. in approximately real-time. For example, in a distributed server or cloud computing environment, efficient distribution of processing work across the servers of the distributed server network or cloud enhances efficiency and maximizes the available computing capacity. Online workload or usage learning can be used to model, analyze and/or optimize this workload distribution. For example, in some illustrative environments, workload data are collected at 15 minute intervals, and it is desired for the online learning to generate a predictor that predicts the usage on a time scale of 15 minutes. This is merely an example, and the time frame for data collection is problem-specific.

Online learning is of especial value when the parameter of interest is non-stationary, that is, when its behavior on long time scales does not exhibit strong periodicity or repetitiveness or, more generally, the parameter being measured changes arbitrarily over time. In such non-stationary problems, the online learning should adapt on the time scale over which meaningful changes in the parameter value are expected. In the illustrative distributed computing example, workload distribution is expected to change arbitrarily over time due to various factors like change in the dominant application of target server (e.g., a web server reconfigured as a database server) or re-allocation of target server resulting in change of ownership (and hence usage) of the server, and so forth.

In a known approach for online prediction of a non-stationary parameter, an ensemble of regressors is used to deal with the non-stationarity aspect of the regression problem. See Kolter et al., "Dynamic weighted majority: An ensemble method for drifting concepts" J. Mach. Learn. Res., vol. 8, pp. 2755-90 (2007); Cosma Rohilla Shalizi et al., "Adapting to non-stationarity with growing expert ensembles" arXiv: 1103.0949v (2011); Elwell et al., "Incremental learning of concept drift in nonstationary environments" Trans. Neur. Netw., vol. 22, no. 10, pp. 1517-31 (2011); Ditzler et al., "An incremental learning algorithm for non-stationary environments and class imbalance" in Proceedings of the 2010 20th International Conference on Pattern Recognition, ser. ICPR '10 (Washington, D.C., USA: IEEE Computer Society, 2010, pp. 2997-3000); Elwell et al., "Incremental learning of variable rate concept drift" in Proceedings of the 8th International Workshop on Multiple Classifier Systems, ser. MCS '09. Berlin, Heidelberg: Springer-Verlag, 2009, pp. 142-151. These algorithms typically create an ensemble of regressors trained over past data and then, after every t time steps (sometimes called an "episode"), evolve or refactor the ensemble composition by performing one or more ensemble actions such as adding a new regressor, fully or partially forgetting past knowledge by decaying one or more regressors, reassigning weights of regressors in accordance with predefined accuracy measure, reassigning weights of instances, or so forth in order to deal with non-stationarity of the environment.

These approaches are computationally inefficient for larger scale problems. By way of example, in the distributed computing workload prediction problem, the scale of workload data rapidly increases with the number of servers and with reduced time scale (i.e. short episodes and frequent updates). For accurate evolution of the ensemble, a number of computationally costly ensemble actions are taken after each episode, e.g. adding a new regressor and reassigning weights of all regressors or of all or most recent instances. For online non-stationary learning, this negatively impacts the execution speed of online prediction algorithm and is computationally expensive.

BRIEF DESCRIPTION

In some illustrative embodiments disclosed as illustrative examples herein, a method comprises performing ensemble learning of an ensemble of classifiers or regressors to predict a non-stationary time-varying parameter over a time series of episodes. Each episode comprises a time period. The ensemble learning includes for an episode of the time series of episodes: selecting an ensemble action from a set of ensemble actions based on ensemble action quality values (Q values) for the ensemble actions at an error state for the episode that is indicative of error of the ensemble of classifiers or regressors in predicting the non-stationary time-varying parameter; executing the selected ensemble action to update the ensemble of classifiers or regressors; computing or retrieving a cost of executing the selected ensemble action; computing a reward indicative of how well the updated ensemble of classifiers or regressors predicts the non-stationary time-varying parameter over the episode; and updating the Q value for the selected ensemble action at the error state for the episode based on both the reward and the cost of executing the selected ensemble action. The performing of ensemble learning is suitably performed by an electronic data processing device programmed to perform the ensemble learning. The computed or retrieved cost of executing the selected ensemble action may be based on the selected ensemble action alone, or may be based on both the selected ensemble action and the error state for the episode. The cost may suitably be based on computational cost of performing the selected ensemble action or computational time to perform the selected ensemble action. In some embodiments the method further includes operating a distributed computing system wherein the non-stationary time-varying parameter is the workload of a computer of the distributed computing system. In some embodiments the method further includes operating a printer network wherein the non-stationary time-varying parameter is an operational state of a printer of the printer network.

In some illustrative embodiments disclosed as illustrative examples herein, a non-transitory storage medium stores instructions readable and executable by a computer to perform processing for an episode comprising a time interval of online ensemble learning of an ensemble of classifiers or regressors to predict a non-stationary time-varying parameter, the processing performed for the episode including: selecting an ensemble action from a set of ensemble actions based on ensemble action quality values (Q values) for the ensemble actions at an error state for the episode; executing the selected ensemble action; after executing the selected ensemble action, computing a reward indicative of how well the ensemble of classifiers or regressors predicts the non-stationary time-varying parameter over the episode; and updating the Q value for the selected ensemble action at the error state for the episode based on the computed reward. In some embodiments the processing performed for the episode further comprises computing or retrieving a cost of executing the selected ensemble action, wherein the updating comprises updating the Q value for the selected ensemble action at the error state for the episode based on both the reward and the cost of executing the selected ensemble action. In some embodiments the non-stationary time-varying parameter is one of (i) workload of a computer of a distributed computing system; and (ii) operational state of a printer of a printer network.

In some illustrative embodiments disclosed as illustrative examples herein, an apparatus comprises an electronic data processing device configured to perform online ensemble learning of an ensemble of classifiers or regressors to predict a non-stationary time-varying parameter, the performed online ensemble learning including, on a periodic basis, selecting an ensemble action from a set of ensemble actions and executing the selected ensemble action, and computing a reward indicative of how well the updated ensemble of classifiers or regressors predicts the non stationary time-varying parameter. The selecting is based on both costs of executing the ensemble actions of the set of ensemble actions and on reward values previously computed for ensemble actions of the set of ensemble actions. In some embodiments the selecting comprises selecting an ensemble action from the set of ensemble actions based on ensemble action quality values (Q values) for the ensemble actions of the set of ensemble actions, and the performed online ensemble learning further includes updating the Q value of a most recently executed ensemble action based on both the cost of executing the most recently executed ensemble action and on a reward value computed after executing the most recently executed ensemble action. The updating may be performed on a less frequent basis than the periodic basis on which the selecting and computing is performed.

DETAILED DESCRIPTION

The online learning approaches disclosed herein are premised on the recognition herein that the various ensemble actions typically applied to track nonstationarity of the predicted parameter are not all of equivalent effectiveness for a given situation, and moreover the different ensemble actions can have widely differing computational costs. For example, adding and training a new a regressor is usually more computationally expensive than reassigning the weights of the existing regressors. In view of these observations, it is disclosed herein to employ a ensemble learning approach in conjunction with reinforcement learning, e.g. a Q-learning method, used to select the "best" ensemble action to perform at a given point in time (i.e. episode interval). In the Q-learning approach, the ensemble action is selected based on ensemble action quality (Q) metrics computed for the ensemble actions. In this context, it is further disclosed herein to construct the ensemble action quality (Q) metric to include both a reward component quantitatively measuring predictive improvement achieved by the ensemble action and a cost component quantitatively measuring the cost of performing the ensemble action.

It will be appreciated that these disclosed approaches mitigate the disadvantages of online ensemble learning for predicting a non-stationary parameter such as server workload. The computational cost of ensemble learning is reduced both by performing fewer ensemble actions (e.g. as few as zero or one ensemble action per episode in some disclosed embodiments) and by weighing reward versus computational cost in choosing which ensemble actions to perform.

Figure 1:
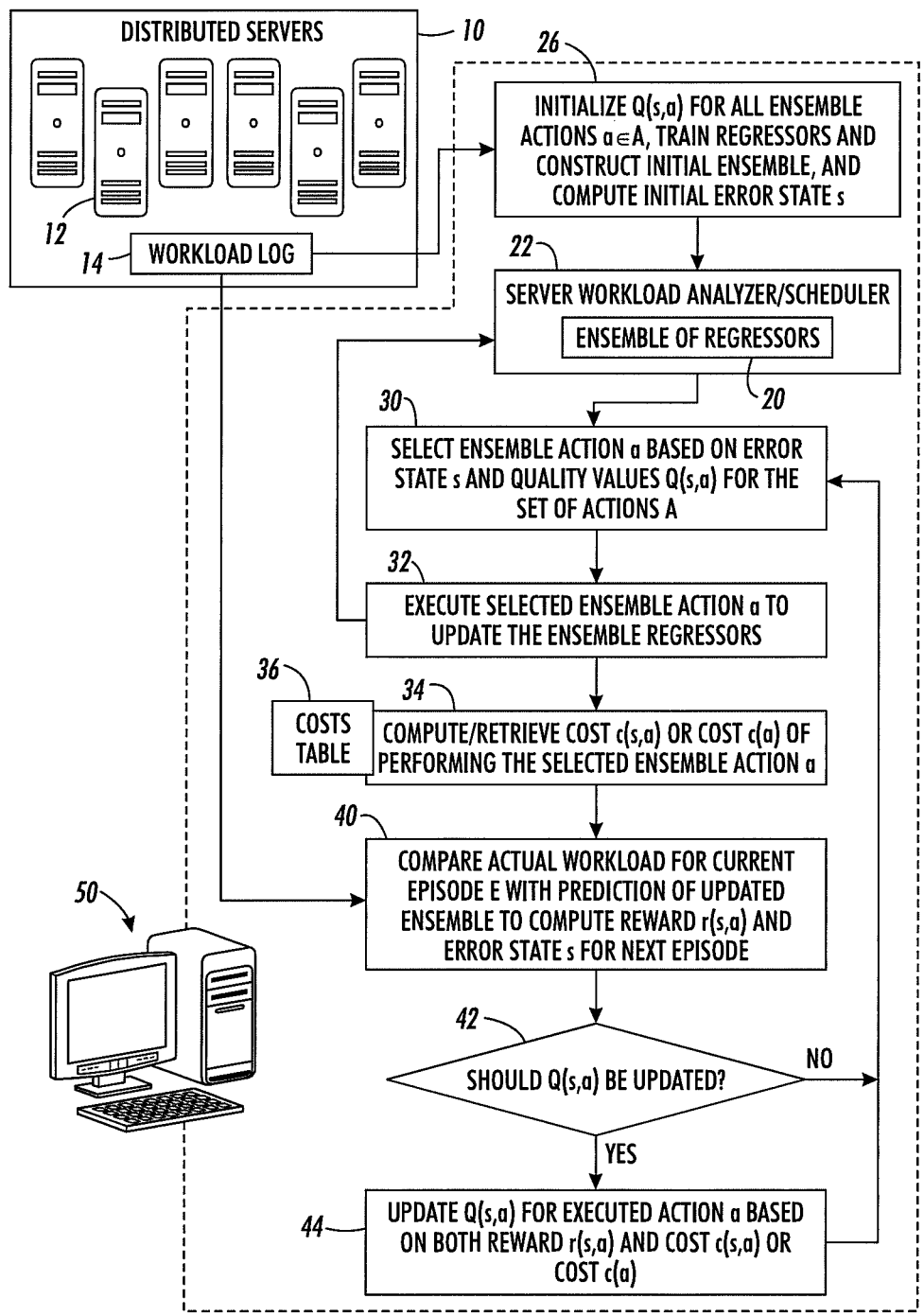
FIG. 1 diagrammatically shows an illustrative online ensemble learning system for learning an ensemble of classifiers or regressors to predict a non-stationary time-varying parameter comprising workload of a computer (i.e. server) of a distributed computing system.

With reference to FIG. 1, a distributed computing system 10 includes a plurality of computers 12, such as network-based server computers (as illustrated) or other type(s) of computers operating in an interconnected fashion. In some embodiments the distributed computing system 10 is accessible via the Internet and constitutes a cloud computing system. In other embodiments the distributed computing system 10 may be a network of local computers, for example providing computing capacity for internal computing of a corporation, non-profit group, or other entity. The distributed computing system 10 maintains a workload log 14 storing information about the workload of each server or other computer 12 of the system 10. The workload data are stored in small increments, e.g. fifteen minute increments in some systems, although longer, shorter, and/or variable increment intervals are contemplated. The workload distribution over the computers 12 of the system 10. Workload can be quantified in various ways, such as percent of total central processing unit (CPU) capacity. The workload for a given computer 12 is in general a non-stationary time-varying parameter, since the workload may fluctuate arbitrarily over time as users add or shed load, various other computers 12 are brought into or switched out of the system 10, or so forth. The online ensemble learning system learns an ensemble of regressors 20 that are used by a server workload analysis and/or scheduling system 22 to analyze the workloads for purposes such as scheduling future work, estimating whether additional server capacity should be brought online (or whether server capacity can be shed), or so forth. While operation of the online ensemble learning system is described for one computer 12 of the system 10, it is to be appreciated that multiple instances of ensembles of regressors may be employed to predict workload on respective multiple computers 12 of the system 10.

While workload of a server or other computer 12 of a distributed computing system 10 serves here as an illustrative example of a non-stationary time-varying parameter, more generally the disclosed online ensemble learning systems may be applied to perform online prediction of any non-stationary time-varying parameter. As another example, the non-stationary time-varying parameter may be the operational state of a printer of a printer network, in which case the online ensemble learning system may be used to predict maintenance workload for purposes such as hiring or scheduling maintenance personnel, estimating when printers will need to be repaired or replaced, or so forth. In this application the regressors are suitably replaced by classifiers, for example regressors each coupled with thresholding components to output the operational state as a discrete value (e.g. states "operational" or "non-operational"; or, states "operational", "needs maintenance", "offline"; et cetera). Instead of a regressor-plus-thresholder configuration, the classifiers can be constructed in other configurations, e.g. which directly output a class.

In the illustrative online ensemble learning techniques, the prediction error space is discretized into discrete error intervals, and error interval is an error state. While discrete error states are described, continuous error states are also contemplated. For the illustrative workload prediction application, an error of, e.g., 1.67% is typically not considered much different from error of, say, 1.9%, and so the use of discrete error intervals as discrete error states is easily justified for this application. The ensemble of regressors (or classifiers, in some other applications) is subject to various ensemble actions that update the ensemble. In the illustrative examples, the following set of ensemble actions is considered: Ensemble Action 1—creating, training and adding a new regressor in the ensemble; Ensemble Action 2—updating weights of each regressor in the ensemble based on their prediction accuracy; Ensemble Action 3—updating weights of only most-recent regressor in the ensemble based on its prediction accuracy; Ensemble Action 4—updating instance weights based on each regressor's accuracy on the instance; and Ensemble Action 5—no refactoring (i.e., a "null" ensemble action that does not update the regressors). Some illustrative examples of these ensemble actions are described, for example in: Kolter et al., "Dynamic weighted majority: An ensemble method for drifting concepts" J. Mach. Learn. Res., vol. 8, pp. 2755-90 (2007); Elwell et al., "Incremental learning of concept drift in nonstationary environments" Trans. Neur. Netw., vol. 22, no. 10, pp. 1517-31 (2011); Ditzler et al., "An incremental learning algorithm for non-stationary environments and class imbalance" in Proceedings of the 2010 20th International Conference on Pattern Recognition, ser. ICPR '10 (Washington, D.C., USA: IEEE Computer Society, 2010, pp. 2997-3000); Elwell et al., "Incremental learning of variable rate concept drift" in Proceedings of the 8th International Workshop on Multiple Classifier Systems, ser. MCS '09. Berlin, Heidelberg: Springer-Verlag, 2009, pp. 142-151.

In the following, the set of ensemble actions is denoted A, and an ensemble action belonging to this set is denoted a∈A. Each error state is denoted s. A goal of the online ensemble learning disclosed herein is to select the best action a of the set A to be performed for a given error state s, and so the quality of (error state, ensemble action) pairs denoted (s,a) is of interest. In the illustrative examples, Q-learning is employed, in which ensemble action quality values (Q values) are estimated for the ensemble actions. It is assumed that the quality of an ensemble action may in general vary with error state (e.g., an ensemble action of creating, training, and adding a new regressor may yield a large reward when the error state is large, but may be less useful when the error state is small). Accordingly, the Q values are computed at a particular error state, or in other words the Q values depend on both error state s and ensemble action a, i.e. can be written as Q(s,a). (In the case of continuous error states, not illustrated, this can be approximated by computing Q(s,a) for a set of discrete error state bins, or alternatively can be done parametrically, e.g. estimating a continuous Q(s,a) function for a given ensemble action a as a parameterized function and adjusting parameters of that function to compute the Q values.)

An ensemble action is selected based on the Q values of the ensemble actions of the set of ensemble actions A. After an ensemble action a is selected and executed, a reward is estimated based on the improvement in accuracy of the prediction algorithm using the ensemble of regressors 20 updated by the execution of the ensemble action. In general, execution of an ensemble action may not yield an immediate significant reward in a single time step, and/or attempting to assess the reward in a single step is likely to produce noisy reward data. Accordingly, in the illustrative examples the reward is assessed over an episode, which is a time interval typically including a plurality of steps (where in the illustrative example a "step" is one data acquisition interval, i.e. the fifteen minute interval between entries in the workload log 14). Estimating the reward over an episode that includes more than one step (in general, denoted as K steps herein), provides noise reduction and a better estimate of the reward for executing the selected ensemble action.

The generic framework in which an environment is characterized by states, and an agent selects and executes improvement actions which are then assessed by measuring a reward metric, is sometimes referred to as reinforcement learning (RL). In RL terminology, a batch of K time steps constitutes an episode, which is the time interval over which the reward is estimated. In active concept drift scenarios, the episode time interval can be a small value, like 3 or 4 steps per episode, while in passive concept drift scenarios, the episode time interval can be relatively larger, e.g. 20 or 25 steps per episode.

As already noted, the Q values for an ensemble action a are typically expected to be dependent on the error state s, i.e. Q(s,a). Accordingly, the reward is in general computed for a specific executed action a at an error state s, and the reward is suitably denoted r(s,a). For an episode comprising K discrete steps, a suitable reward formulation is:

$$r(s, a) = \frac{\sum_{k=1}^{K} \frac{F}{|\hat{y}_k - y_k|}}{K} \quad (1)$$

where F is a scaling factor with F≥1, and ŷ represents the non-stationary time-varying parameter (e.g. workload as predicted by the ensemble 20) as predicted by the ensemble of regressors (or classifiers) and y represents the actual (i.e. measured) non-stationary time-varying parameter (e.g. actual workload recorded in the log 14). Hence, the reward r(s,a) is proportional to the accuracy of prediction of the ensemble averaged over all time steps in an episode of length K steps. More generally, the reward r(s,a) is a computed value indicative of how well the ensemble of classifiers or regressors updated by executing the selected ensemble operation a at the error state s predicts the non-stationary time-varying parameter over the episode.

In some embodiments the Q value is based on the reward r(s,a) alone. In such embodiments, more efficient online ensemble learning can be obtained by performing only a single ensemble action having the highest reward. However, with this approach the online ensemble learning will always select the action providing the highest reward. In particular, a more computationally costly ensemble action will be selected over a less computationally costly ensemble action if the reward of the more computationally costly action is even slightly better than the reward for the less computationally costly action.

To avoid such a situation, the illustrative online ensemble learning of FIG. 1 incorporates into the ensemble action quality value Q(s,a) for an ensemble action a both the reward r(s,a) and a cost c of performing the ensemble action. The cost c of each ensemble-action may be modeled based on factors such as computational time and resources, or so forth, such that ensemble action with higher time or space complexity is assigned relatively higher cost c than other ensemble actions. Said another way, the cost c of executing an ensemble action is suitably based on computational cost of performing the ensemble action, or computational time to perform the ensemble action, or so forth. The cost can in general be modeled as a function of the ensemble action alone, denoted by c(a), or the cost can be modeled a function of the ensemble action and the error state, denoted by c(s,a). The formulation c(a) simplifies computation since the cost c(a) does not depend on the error state s. On the other hand, the cost c(s,a) advantageously takes into account possible dependencies of the computational complexity or time on the error state s. For example, if the training of a new regressor, or the updating of weights of regressors, or other ensemble action a whose cost is being estimated is performed iteratively, then the number of iterations to obtain convergence may depend on how much correction is needed, with larger numbers of iterations typically required for error states indicative of larger error between the ensemble prediction and the actually measured workload (or other non-stationary time-varying parameter being predicted).

The cost c(s,a) or c(a) can be estimated by analysis of the computer algorithm performing the ensemble action a. Alternatively, the c(s,a) or c(a) can be estimated empirically by actually executing the computer algorithm performing the ensemble action a and measuring the number of CPU cycles, the computing time, or another suitable cost metric. A combination of such approaches is also contemplated.

It should be noted that relatively small errors in estimating the costs are typically acceptable, since the purpose of the costs is to prevent selection of a much more costly action $a_1$ over a much less costly action $a_2$ in cases where the difference in rewards $r(s,a_1)$, $r(s,a_2)$ is small. Such a case by definition has $c(a_1) \gg c(a_2)$ (or $(s,a_1) \gg c(s,a_2)$ if the costs also depend on the error state s), and an error $\epsilon$ in the costs of order $\epsilon < (c(a_1)-c(a_2))$ is acceptable.

The ensemble action quality values (Q values) depend on both the rewards r(s,a) and the costs c(a) or c(s,a). The ensemble learning problem is suitably formulated using model-free a RL learning method such as, in the illustrative examples, Q learning. See, e.g. C. J. C. H. Watkins, "Learning from delayed rewards", Ph. D. dissertation, King's College, Cambridge, UK, May 1989. In embodiments in which the estimation of the cost of executing a selected ensemble action is based on the selected ensemble action alone (that is, the cost is modeled as c(a)), the cost is independent of the state s and is solely and statically determined by the ensemble action a, and the Q-learning can be modeled as follows:

$$Q(s,a) \leftarrow Q(s,a) + \alpha\left[w(r(s,a), c(a)) + \gamma \max_a Q(s',a') - Q(s,a)\right] \quad (2)$$

with $$w(r(s,a),c(a))=(s,a)+(1-\phi)c(a) \quad (3)$$

where w(r(s,a), c(a)) represents a weighted reward function in which $\phi \in [0,1]$ determines the influence of the reward r(s,a) and the cost c(a) in the Q-learning updates, $\alpha$ is the learning rate, and $\gamma$ is the discount factor. The model of Equations (2) and (3) employing cost c(a) depending on the ensemble action a alone is referred to herein as the action cost model.

In embodiments in which the estimation of the cost of executing a selected ensemble action is based on both the selected ensemble action and the error state for the episode (that is, the cost is modeled as c(s,a)), the Q-learning can be modeled as follows:

$$Q(s,a) \leftarrow (1-\alpha)Q(s,a) + \alpha\left(r(s,a) + \gamma \max_a Q(s',a') - Q(s,a)\right) \quad (4)$$

$$\overline{Q}(s,a) \leftarrow (1-\alpha)\overline{Q}(s,a) + \alpha\left(c(s,a) + \overline{\gamma} \max_a \overline{Q}(s',a') - \overline{Q}(s,a)\right) \quad (5)$$

where $\gamma, \overline{\gamma}$ are discount factors. The final Q value is denoted as $Q_\phi(s,a)$ and is computed by taking a weighted sum of Q(s,a) and $\overline{Q}(s,a)$ as follows:

$$Q_\phi(s,a) \leftarrow \phi Q(s,a) - \overline{Q}(s,a) \quad (6)$$

where $\phi \in [0,1]$ determines the influence of reward-based Q value Q(s,a) and the cost-based Q value $\overline{Q}(s,a)$ on the final Q value $Q_\phi(s,a)$. The model of Equations (4)-(6) employing cost c(s,a) depending on both the ensemble action a and the error state s is referred to herein as the state-action cost model.

The action cost model (Equations (2) and (3)) and the state-action cost model (Equations (4)-(6)) are merely illustrative examples, and it is contemplated to employ other RL models, such as other models of constrained Q-learning.

To further reduce computational load, it is contemplated to perform delayed Q-learning as described in Strehl et al., "Pac model-free reinforcement learning," in Proceedings of the 23$^{rd}$ international conference on Machine learning, ser. ICML '06 (New York, N.Y., USA: ACM, 2006) pp. 881-888. In this approach, after each episode E, the Q value of error state s and executed ensemble action a is updated only if an update criterion is met. In the action cost model (where cost c(a) is used), a suitable update criterion is as follows. The cumulative update value is given by:

$$\sum_{e=\eta}^{E}\left(w_e(r_e(s,a), c_e(a)) + \gamma\left(\max_a Q_e(s',a') - Q_e(s,a)\right)\right) \quad (7)$$

where $\eta$ is the episode at which the Q value for the state-action pair (s,a) was last updated. The cumulative update value of Equation (7) is computed from current episode E to episode $\eta$. If the absolute difference between the Q value for the current episode E, denoted $Q_E(s,a)$, and the cumulative update value of Equation (7) is greater than a threshold $\epsilon$ then the Q value update is performed in the current episode E. This criterion is expressed mathematically as follows:

$$\left|Q_E(s,a) - \sum_{e=\eta}^{E}\left(w_e(r_e(s,a), c_e(a)) + \gamma\left(\max_a Q_e(s',a') - Q_e(s,a)\right)\right)\right| \geq \epsilon \quad (8)$$

In the state-action model (where cost c(s,a) is used) the Q value in episode E is updated if the absolute difference between the current reward-based Q value $Q_E(s,a)$ and the respective cumulative update value is greater than a threshold $\epsilon$:

$$\left|Q_E(s,a) - \sum_{e=\eta}^{E}\left(r_e(s,a) + \gamma\left(\max_a Q_e(s',a') - Q_e(s,a)\right)\right)\right| \geq \epsilon \quad (9)$$

and the absolute difference between the current cost-based Q value $\overline{Q}_E(s,a)$ and the respective cumulative update value is greater than a threshold $\overline{\epsilon}$:

$$\left|\overline{Q}_E(s,a) - \sum_{e=\eta}^{E}\left(c_e(s,a) + \gamma\left(\max_a \overline{Q}_e(s',a') - \overline{Q}_e(s,a)\right)\right)\right| \geq \overline{\epsilon} \quad (10)$$

The reward-related and cost-related thresholds $\epsilon$ and $\overline{\epsilon}$ may be the same or different. In addition to the updates of Equation (8) (for the action cost model), or Equations (9)-(10) (for the state-action cost model), the Q value update criterion includes a second prong in which the Q value Q(s,a) in an episode E is updated if the error state-ensemble action pair (s,a) is selected/executed more than a maximum of n times since the last episode in which Q(s,a) was updated. Denoting the number of episodes of state s since the last Q value update in which the action a is selected/executed as $count_{s,a}$, the full Q value update criterion is:

Update if:
1. The criterion of Equation (8) or of Equations (9)-(10) is satisfied OR (11)
2. Number of executions of ensemble action a in error state s since last update of Q(s,a) is greater than threshold (i.e., $count_{s,a} > n$)

It will be appreciated that this is an illustrative delay criterion, and other criteria for delaying Q value updates are contemplated.

Figure 2:
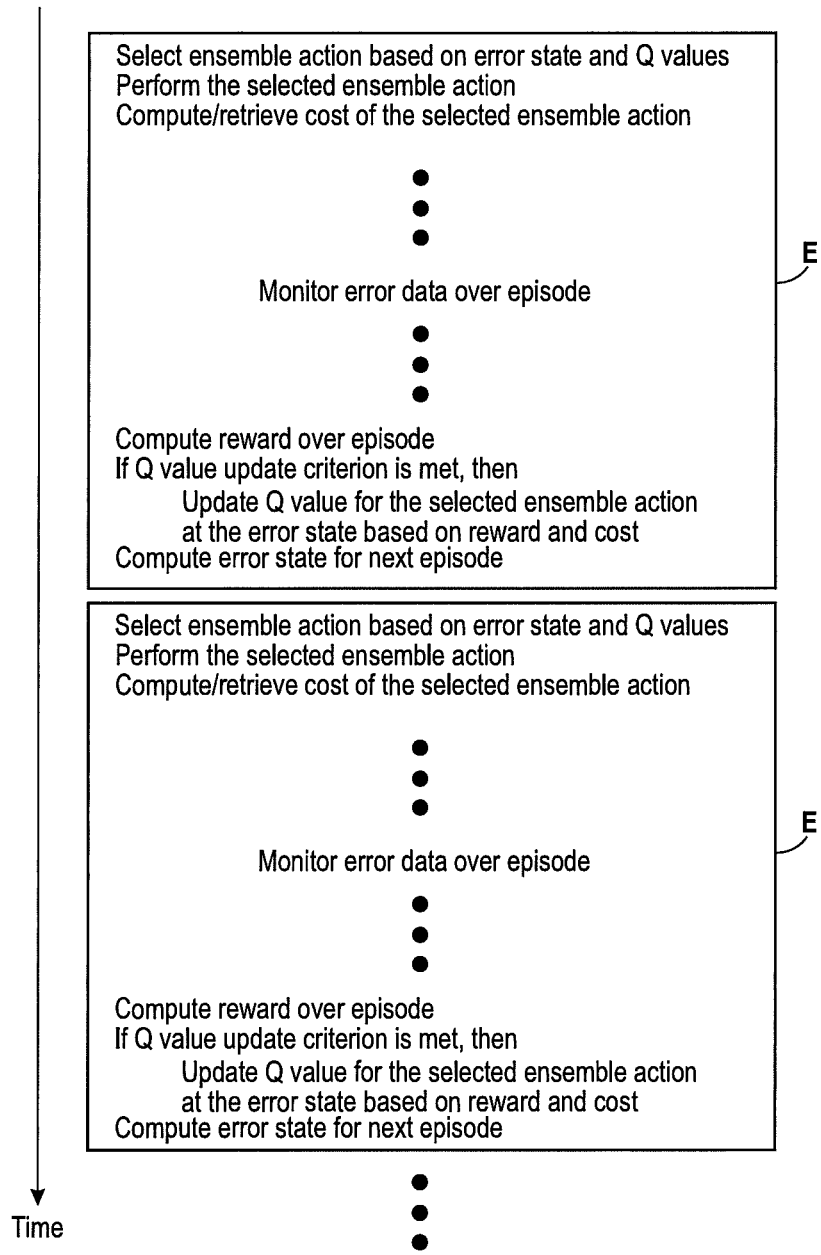
FIG. 2 diagrammatically shows episodic processing performed by the online ensemble learning system of FIG. 1.

With continuing reference to FIG. 1 and with further reference to FIG. 2, the illustrative online learning process is described. FIG. 1 provides a diagrammatic representation of the process. Prior to initiating the online ensemble learning, the Q values are initiated to default values for the actions of the set of ensemble actions A, the regressors are trained and the initial ensemble constructed, and the initial error state is computed in an operation 26. The episodic online learning then commences—FIG. 2 diagrammatically shows two episodes E of a time series of episodes of the online learning process. In each episode E, an ensemble action a is selected for execution based on the error state s and the Q values for the actions of the set of actions A (operation 30 of FIG. 1); the selected ensemble action a is executed to update the ensemble of regressors 20 (operation 32 of FIG. 1); and the cost of executing the selected ensemble action a is computed (operation 34 of FIG. 1). The execution operation 32 as used herein encompasses "execution" of a null ensemble action that does not update the regressors, if such a null ensemble action is a member of the set of actions A and is selected for execution in operation 30. The execution in this case comprises identifying or recognizing the null ensemble action has been selected and not performing any ensemble update. The cost c(a) or c(s,a) for a null ensemble action is suitably set to zero in some embodiments, although some non-zero cost may be assigned to the null ensemble action to account for processing to identify or recognize selection of the null ensemble action.

The cost c(a) depends only on the selected/executed ensemble action a in the action cost model, and so it is typically feasible and efficient to pre-compute (that is, estimate offline) the costs c(a) for the actions of the set of actions A and to store these precomputed costs in a costs table 36. In this case, the operation 34 retrieves the cost c(a) from the costs table 36. In the case of the state-action cost model, the cost c(s,a) depends on both the error state s and the selected/executed ensemble action a. If the error states s are discretized then it is typically possible and advantageous to pre-compute the costs c(s,a) and store them in the costs table 36. On the other hand, if the error states s are continuous or are discretized into a large number of state levels, then it may be more efficient to compute the cost c(s,a) online, in which case the costs table 36 is omitted and the operation 34 computes c(s,a) during the episode E. Online computation of the cost may also be useful if it is desired for the cost to account for real-time factors impacting the cost, such as the computing capacity currently available.

With continuing reference to FIGS. 1 and 2, in an operation 40 the actual workload of the server is monitored and compared with the ensemble prediction over the course of the episode E, the reward r(s,a) is computed (along with the cumulative update of Equation (7) for the action cost model, or the equivalent summation components of Equations (9) and (10) for the state-action cost model), and the new error state for the next episode is computed. In a decision operation 42 the update criterion of Equation (11) is evaluated. If so indicated by the decision 42, an update operation 44 is performed to update the Q value Q(s,a) for the ensemble action a that was selected in operation 30 and executed in operation 32. The update operation 44 suitably operates accord with Equations (2)-(3) for the action cost model, or in accord with Equations (4)-(5) for the state-action cost model. After the update operation 44, process flow returns to selection operation 30 for the next episode E. On the other hand, if the decision 42 indicates the Q value update should be delayed, then processing flows back to operation 30 for the next episode E without performing update operation 44.

With continuing reference to FIG. 1, the online learning is performed by an illustrative computer 50 or other electronic data processing device programmed to perform the online learning operations 26, 30, 32, 34, 40, 42, 44. The same computer 50 or other electronic data processing device may also implement the server workload analyzer/scheduler 22, or alternatively a different computer or other different electronic data processing device may access the ensemble of regressors 20 learned by the online learning operations 26, 30, 32, 34, 40, 42, 44 and use the ensemble 20 for operations such as workload analysis and/or scheduling. It will also be appreciated that the disclosed online learning techniques may be embodied by an electronic storage medium storing instructions executable by the illustrative computer 50 or other electronic data processing device (that is, programming the illustrative computer 50 or other electronic data processing device) to perform the disclosed online learning processes. The electronic storage medium may, for example, comprise a hard disk drive or other magnetic storage medium, an optical disk or other optical storage medium, a random access memory (RAM), read-only memory (ROM), flash memory or other electronic storage medium, various combinations thereof, or so forth.

Listing 1 - Online Learning for Non-Stationary Environments
using state-action cost model in which the cost is c (s , a)

Input: D - Training dataset
Input: A - Set of ensemble-actions
Input: S - Set of error states
Input: n - Desired delay
Input: $\epsilon$ - Threshold for reward-based Q-value
Input: $\hat{\epsilon}$ - Threshold for cost-based Q-value
begin
  1. Initialization:
    For each (s, a) pair $$\text{Initialize } Q(s, a) \text{ to } \frac{1}{|A|}$$

$s \leftarrow s_0$ //Set initial state
  2. Training phase:
    Train regressors on D
    Assign equal weights to regressors
    Add regressors to ensemble $\mathcal{E}$
  3. Online Learning phase:
  $count_{s,a} \leftarrow \emptyset$ //Represents the number of times action a was taken in state s
    3.1 Select ensemble-action a based on $\epsilon$-Greedy policy
    3.2 Execute a and refactor ensemble $\mathcal{E}$
    3.3 Increment $m_{s,a}$
      3.3 Calculate average reward for episode E of length K:

$$r(s, a) = \frac{\sum_{k=1}^{K} \frac{F}{|\hat{y}_k - y_k|}}{K}$$

3.4 Compute reward-based Q-value update $R_{s,a}$ as:
      $R_{s,a} = R_{s,a} + r(s, a) + \gamma(\max'_a Q(s', a') - Q(s, a))$ -continued Listing 1 - Online Learning for Non-Stationary Environments
using state-action cost model in which the cost is c (s , a)

```
        3.5 Compute cost-based Q-value update C(s, a) as:
            C_{s,a} = C_{s,a} + c(s, a) + γ̄(max'_a Q̄(s', a') − Q(s, a))
        3.6 If ((|Q(s, a) − R_{s,a}| ≥ ε and |Q̄(s, a) − C_{s,a}| ≥ ε̄) or
        count_{s,a} > n)
            3.6.1 Compute reward-based Q-value Q(s, a) as:
                Q(s, a) ← Q(s, a) + αR_{s,a}
            3.6.2 R_{s,a} ← 0
            3.6.3 Compute cost-based Q-value Q̄(s, a) as:
                Q̄(s, a) ← Q̄(s, a) + αC_{s,a}
            3.6.4 C_{s,a} ← 0
            3.6.5 Compute composite/final Q-value Q_φ (s, a) as:
                Q_φ(s, a) ← φQ(s, a) − Q̄(s, a)
            3.6.6 Q(s, a) ← Q_φ(s, a)
            3.6.7 Set count_{s,a} ← 0
end
```

With reference to Listing 1, pseudocode for an illustrative online learning algorithm for learning a non-stationary time-varying parameter in accord with the online learning process of FIGS. 1 and 2 is presented. The pseudocode of Listing 1 employs the state-action cost model in which cost $c(s,a)$ is a function of both the selected ensemble action a and the state s of the episode for which action a is executed. The initiation Step 1 and training Step 2 of Listing 1 correspond to the initiation operation 26 of FIG. 1. Step 3 of Listing 1 corresponds to the episodic online learning operations 30, 32, 34, 40, 42, 44 of FIG. 1. More particularly, Step 3.1 corresponds to selection operation 30; Step 3.2 corresponds to operation 32; Step 3.3, 3.4, and 3.5 correspond to operations 34 and 40; the "If" clause of Step 3.6 corresponds to decision operation 42; and the Steps 3.6.1-3.6.7 correspond to operation 44.

In actually performed experiments, the disclosed online learning was performed, along with a baseline algorithm for comparison in which multiple ensemble actions were executed after each episode of t time steps. Recall that in the disclosed approach (e.g. FIGS. 1 and 2, Listing 1), after each episode, a single ensemble-action a is selected and executed—thus, one might expect the baseline to provide more accurate prediction (due to always executing the multiple ensemble actions) but at a higher computational cost as compared with the disclosed algorithm. The two methods were compared using simulated dataset in which the workload distribution changed arbitrarily after every 12 time steps. This simulation was motivated by a real-world scenario in which one workload data point is collected per server every 15 minutes and server workload remains roughly constant (in mean) on a time scale of 2-3 hours and shows some changes on larger time scales due to various reasons some of which are arbitrary. A set A of four ensemble actions was considered, with a cost $c(s,a)=K_a \lambda$ as set forth in Table 1. In this cost formulation, $\lambda$ is proportional to the error state s and $K_a$ is a constant for the ensemble action a.

TABLE 1

Ensemble actions and their costs

| Ensemble action | Cost |
| --- | --- |
| Creating, training and adding new regressor | 5λ |
| Retraining most recent regressor | 3λ |
| Reassigning weights to regressors | 1λ |
| No refactoring of ensemble | 0 |

In the experimental setup, the continuous error space was discretized to form nine error-states as shown in Table 2. The unequal interval size in the error states is intentional as it resembles real world scenarios in which, for most of the time steps, the workload prediction errors fall in the range of 0-50% and hence finer-grained control for this range is advantageous.

TABLE 2

Discretization of error space

| Error interval | State |
| --- | --- |
| Err < 2% | $s_1$ |
| 2% ≤ Err < 8% | $s_2$ |
| 8% ≤ Err < 15% | $s_3$ |
| 15% ≤ Err < 25% | $s_4$ |
| 25% ≤ Err < 35% | $s_5$ |
| 35% ≤ Err < 45% | $s_6$ |
| 45% ≤ Err < 60% | $s_7$ |
| 60% ≤ Err < 80% | $s_8$ |
| 80% ≤ Err | $s_9$ |

The cost model used in the experiments was the action cost model in which cost depends on the selected ensemble action alone, i.e. cost c(a). When computing the Q values, Equations (2)-(3) were used with $\phi=0.5$.

Normalized Root Mean Squared Error (RMSE) was used to compare the prediction error of the disclosed ensemble prediction and the baseline ensemble prediction. Table 3 presents a summary of the performance improvement obtained using the disclosed online learning as compared with the baseline learning. As might be expected, the disclosed online learning algorithm produced a substantial 279% decrease in costs, which is attributable both to performing only a single ensemble action per episode and to selecting that single ensemble action with consideration given to the cost of the ensemble action. Surprisingly, however, the results reported in Table 3 also show that the disclosed online learning algorithm achieves normalized RMSE measure of 0.2354 while the baseline algorithm achieves 0.2937, corresponding to an improvement of 19.8% in the performance. This performance enchancement is achieved despite performing only a single ensemble action per episode, as compared with performing multiple ensemble actions per episode in the baseline online learning. These results indicate that not only the computational cost, but also the prediction performance, are substantially improved by using the disclosed online learning approach.

TABLE 3

Prediction error and cost analyses

| Algorithm | Normalized RMSE | Cost |
| --- | --- | --- |
| Disclosed online learning algorithm | 0.2354 | 4294λ |
| Baseline algorithm | 0.2937 | 11988λ |
| Improvement (in %) | 19.8% | 279% |

The illustrative embodiments are directed to online learning of an ensemble of regressors to predict a non-stationary time-varying parameter over a time series of episodes. However, the disclosed approaches are readily employed to online learning of an ensemble of classifiers to predict a non-stationary time-varying parameter over a time series of episodes. In this case, the error state is a quantitative value, optionally discretized, computed based on the difference between the actual state of the non-stationary time-varying parameter and the prediction provided by the ensemble of classifiers.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method including:
performing ensemble learning of an ensemble of classifiers or regressors to predict a non-stationary time-varying parameter over a time series of episodes, each episode comprising a time period;
wherein the ensemble learning includes for an episode of the time series of episodes:
selecting an ensemble action from a set of ensemble actions based on ensemble action quality values (Q values) for the ensemble actions at an error state for the episode that is indicative of error of the ensemble of classifiers or regressors in predicting the non-stationary time-varying parameter,
executing the selected ensemble action to update the ensemble of classifiers or regressors,
computing or retrieving a cost of executing the selected ensemble action,
computing a reward indicative of how well the updated ensemble of classifiers or regressors predicts the non-stationary time-varying parameter over the episode, and
updating the Q value for the selected ensemble action at the error state for the episode based on both the reward and the cost of executing the selected ensemble action;
wherein performing of ensemble learning is performed by an electronic data processing device programmed to perform the ensemble learning.

2. A method operating in conjunction with a set of ensemble actions that includes an ensemble action that does not update the ensemble of classifiers or regressors, the method including:
performing ensemble learning of an ensemble of classifiers or regressors to predict a non-stationary time-varying parameter over a time series of episodes, each episode comprising a time period;
wherein the ensemble learning includes for an episode of the time series of episodes:
selecting an ensemble action from a set of ensemble actions based on ensemble action quality values (Q values) for the ensemble actions at an error state for the episode that is indicative of error of the ensemble of classifiers or regressors in predicting the non-stationary time-varying parameter,
executing the selected ensemble action to update the ensemble of classifiers or regressors,
computing or retrieving a cost of executing the selected ensemble action,
computing a reward indicative of how well the updated ensemble of classifiers or regressors predicts the non-stationary time-varying parameter over the episode, and
updating the Q value for the selected ensemble action at the error state for the episode based on both the reward and the cost of executing the selected ensemble action;
and the performing of ensemble learning further includes, for an episode of the time series of episodes:
selecting the ensemble action that does not update the ensemble of classifiers or regressors based the Q values for the ensemble actions at the error state for the episode,
computing or retrieving a cost of executing the selected ensemble action ensemble action that does not update the ensemble of classifiers or regressors,
computing a reward indicative of how well the updated ensemble of classifiers or regressors predicts the non-stationary time-varying parameter over the episode, and
updating the Q value for the selected ensemble action that does not update the ensemble of classifiers or regressors at the error state for the episode based on both the reward and the cost of executing the selected ensemble action that does not update the ensemble of classifiers or regressors;
wherein performing of ensemble learning is performed by an electronic data processing device programmed to perform the ensemble learning.

3. The method of claim 2 wherein the computing or retrieving a cost of executing the selected ensemble action that does not update the ensemble of classifiers or regressors includes:
setting the cost of executing the selected ensemble action that does not update the ensemble of classifiers or regressors as zero.

4. The method of claim 1 wherein the computing or retrieving a cost of executing the selected ensemble action includes:
computing or retrieving a cost of executing the selected ensemble action based on the selected ensemble action alone.

5. The method of claim 1 wherein the computing or retrieving a cost of executing the selected ensemble action includes:
computing or retrieving a cost of executing the selected ensemble action based on both the selected ensemble action and the error state for the episode.

6. The method of claim 1 wherein the cost of executing the selected ensemble action is based on computational cost of performing the selected ensemble action or computational time to perform the selected ensemble action.

7. The method of claim 1 wherein the set of ensemble actions includes:
an ensemble action creating, training, and adding a new classifier or regressor to the ensemble of classifiers or regressors,
an ensemble action retraining a classifier or regressor of the ensemble of classifiers or regressors, and
an ensemble action reassigning weights to classifiers or regressors of the ensemble of classifiers or regressors.

8. The method of claim 1 further comprising one of:
(1) operating a distributed computing system wherein the non-stationary time-varying parameter is the workload of a computer of the distributed computing system;
(2) operating a printer network wherein the non-stationary time-varying parameter is an operational state of a printer of the printer network.

9. The method of claim 1 further comprising:
operating a distributed computing system wherein the non-stationary time-varying parameter is the workload of a computer of the distributed computing system; and
scheduling workload distribution for the distributed computing system based in part on workload of the computer predicted using the ensemble of classifiers or regressors;

wherein the scheduling is performed by the electronic data processing device which is further programmed to perform the scheduling.

10. A non-transitory storage medium storing instructions readable and executable by a computer to perform processing for an episode comprising a time interval of online ensemble learning of an ensemble of classifiers or regressors to predict a non-stationary time-varying parameter, the processing performed for the episode including:
selecting an ensemble action from a set of ensemble actions based on ensemble action quality values (Q values) for the ensemble actions at an error state for the episode;
executing the selected ensemble action;
after executing the selected ensemble action, computing a reward indicative of how well the ensemble of classifiers or regressors predicts the non-stationary time-varying parameter over the episode;
computing or retrieving a cost of executing the selected ensemble action; and
updating the Q value for the selected ensemble action at the error state for the episode based on both the computed reward and the cost of executing the selected ensemble action.

11. The non-transitory storage medium of claim 10 wherein the computing or retrieving a cost of executing the selected ensemble action includes:
computing or retrieving a cost of executing the selected ensemble action based on the selected ensemble action alone.

12. The non-transitory storage medium of claim 10 wherein the computing or retrieving a cost of executing the selected ensemble action includes:
computing or retrieving a cost of executing the selected ensemble action based on both the selected ensemble action and the error state for the episode.

13. The non-transitory storage medium of claim 10 wherein the cost of executing the selected ensemble action is based on computational cost of performing the selected ensemble action or computational time to perform the selected ensemble action.

14. The non-transitory storage medium of claim 10 wherein the set of ensemble actions includes:
an ensemble action creating, training, and adding a new classifier or regressor to the ensemble of classifiers or regressors,
an ensemble action retraining a classifier or regressor of the ensemble of classifiers or regressors,
an ensemble action reassigning weights to classifiers or regressors of the ensemble of classifiers or regressors, and
an ensemble action that does not update the ensemble of classifiers or regressors.

15. The non-transitory storage medium of claim 10 wherein the non-stationary time-varying parameter is one of (i) workload of a computer of a distributed computing system; and (ii) operational state of a printer of a printer network.

16. An apparatus comprising:
an electronic data processing device configured to perform online ensemble learning of an ensemble of classifiers or regressors to predict a non-stationary time-varying parameter, the performed online ensemble learning including, on a periodic basis:
selecting an ensemble action from a set of ensemble actions and executing the selected ensemble action; and
computing a reward indicative of how well the updated ensemble of classifiers or regressors predicts the non-stationary time-varying parameter;
wherein the selecting is based on both costs of executing the ensemble actions of the set of ensemble actions and on reward values previously computed for ensemble actions of the set of ensemble actions
wherein, for at least one ensemble action of the set of ensemble actions, the performed online ensemble learning assigns different costs for executing the ensemble action at different error states of the ensemble of classifiers or regressors, wherein the different error states correspond to different levels of prediction error of the ensemble of classifiers or regressors respective to measured values of the non-stationary time-varying parameter.

17. The apparatus of claim 16 wherein the selecting comprises selecting an ensemble action from the set of ensemble actions based on ensemble action quality values (Q values) for the ensemble actions of the set of ensemble actions, and the performed online ensemble learning further includes:
updating the Q value of a most recently executed ensemble action based on both the cost of executing the most recently executed ensemble action and on a reward value computed after executing the most recently executed ensemble action.

18. The apparatus of claim 17 wherein the updating is performed on a less frequent basis than the periodic basis on which the selecting and computing is performed.

19. The apparatus of claim 16 wherein the performed online ensemble learning assigns the cost for executing each ensemble action of the set of ensemble actions based on the identity of the ensemble action alone.

* * * * *